(12) United States Patent
Tijink et al.

(10) Patent No.: US 9,086,279 B2
(45) Date of Patent: Jul. 21, 2015

(54) METHOD FOR DETERMINING THE LENGTH OF A PATH TRAVELED BY A VEHICLE

(71) Applicant: Kapsch TrafficCom AG, Vienna (AT)

(72) Inventors: Jasja Tijink, Breitenfurt (AT); Thomas Scheider, Gerasdoft (AT); Franz Weimann, St. Johann im Pongau (AT); Sören Schrödl, Mödling (AT)

(73) Assignee: Kapsch TrafficCom AG, Vienna (AT)

(*) Notice: Subject to any disclaimer, the term of this patent is extended or adjusted under 35 U.S.C. 154(b) by 72 days.

(21) Appl. No.: 13/965,740

(22) Filed: Aug. 13, 2013

(65) Prior Publication Data

US 2014/0046583 A1    Feb. 13, 2014

(30) Foreign Application Priority Data

Aug. 13, 2012  (EP) .................................... 12180295

(51) Int. Cl.
*G01C 22/00*  (2006.01)
*G01C 21/34*  (2006.01)
*G01C 21/30*  (2006.01)

(52) U.S. Cl.
CPC ................ *G01C 22/00* (2013.01); *G01C 21/30* (2013.01); *G01C 21/34* (2013.01)

(58) Field of Classification Search
CPC ........ G01C 22/00; G01C 22/30; G01C 22/34; G01C 22/02
USPC .................. 701/411, 412, 445–447, 469, 475
See application file for complete search history.

(56) References Cited

U.S. PATENT DOCUMENTS

2007/0250263 A1*  10/2007  Yamada ........................ 701/207
2010/0106405 A1    4/2010  Hu
2012/0059578 A1*  3/2012  Venkatraman ................ 701/411

FOREIGN PATENT DOCUMENTS

EP      1736932 A1    12/2006
EP      2431712 A1    3/2012

OTHER PUBLICATIONS

Machine translation of Robl et al. (EP 1736932).*
Extended European Search Report received for application No. 12180295.3, dated Feb. 11, 2013, 7 pages.

* cited by examiner

*Primary Examiner* — Thomas Tarcza
*Assistant Examiner* — Kevin Myhre
(74) *Attorney, Agent, or Firm* — Fiala & Weaver P.L.L.C.

(57) ABSTRACT

Methods are provided for determining the length of a path traveled by a vehicle using an onboard unit that generates a sequence of position readings and a related position quality index for each position reading. A set of consecutive position readings is extracted from the sequence. Position readings are discarded having position quality indices falling below a threshold. A set quality index is determined based on the number of position readings of the set or on the position quality indices. If the set quality index exceeds a threshold, the path length is determined based on mutual distances of consecutive position readings of the set. Otherwise, the path length is determined using a digital road map composed of road segments by associating the position readings of the set with at least one road segment, and determining the path length based on the segment length of the at least one road segment.

20 Claims, 6 Drawing Sheets

METHOD FOR DETERMINING THE LENGTH OF A PATH TRAVELED BY A VEHICLE

CROSS-REFERENCE TO RELATED APPLICATION(S)

This application claims priority to European Patent Application No. 12 180 295.3, filed on Aug. 13, 2012, the entirety of which is incorporated by reference herein.

BACKGROUND

1. Technical Field

The present application relates to a method for determining the length of a path traveled by a vehicle using an onboard unit carried by the vehicle, the unit generating a sequence of readings of the own position thereof.

2. Background Art

Onboard units (OBUs) are used in particular by road toll systems so as to be able to determine and subsequently impose tolls on paths traveled by a vehicle carrying the OBU. For this purpose, an OBU determines its own location, for example, in a global navigation satellite system (GNSS) or in a public land mobile network using several stationary transceivers and thus generates a sequence of position readings ("position fixes"). Each of the generated position readings is subject to measuring inaccuracies, requiring editing of the sequence that is generated.

For the purpose of editing, it is known to compare the generated position readings to a digital road map modeling the road system (map matching). To this end, the respective nearest road segments are determined as having been driven. Depending on the configuration, the OBU for this purpose either transmits the position readings to a back office of the road toll system, where the map matching is carried out ("thin-client OBU"), or the digital road map is stored directly in the OBU, where the map matching is also carried out ("thick-client OBU").

However, map matching methods have the drawback that the accuracy of the path length determination is limited by the segment resolution of the digital road map. The lengths of the paths in fact traveled by a vehicle frequently deviate from the lengths of the digitally modeled road segments: for example in the region of curves, intersections or traffic circles, the path actually driven is dependent on the driving direction of the vehicle, while the segment lengths of the digital road map are generally modeled independently thereof.

On the other hand, it would also be problematic to determine the path lengths based on the position readings because frequent inaccuracies of the position readings conflict with reliable, robust path length determination.

BRIEF SUMMARY

It is an object of the present application to provide a method for determining the length of a path traveled by a vehicle, the method having higher accuracy than previously known systems while being robust with respect to position measuring inaccuracies.

This object is achieved by a method for the type mentioned above using an onboard unit, which generates a sequence of readings of its own position and a related position quality index for every position reading of the sequence, comprising:

extracting a set of consecutive position readings from the sequence, disregarding those position readings, the position quality index of which falls below a predetermined first threshold value;

determining a set quality index based on the number of position readings of the set, or based on the position quality indices thereof; and if the set quality index exceeds a predetermined second threshold value: determining the path length based on mutual distances of consecutive position readings of the set;

otherwise: determining the path length using a digital road map, which is composed of road segments having respective known segment lengths, by associating the position readings of the set with at least one road segment, and determining the path length based on the segment length of this at least one road segment.

The method is based on a two-stage quality comparison. In a first stage, position readings of higher position quality are included in a set, while "poor" position readings are eliminated; thereafter, in a second stage, the quality of the entire set is evaluated: if this quality is high, the path length is determined directly based on the real, "good" position readings of the set and, as a result, offers the greatest precision possible. If the set quality is not sufficient, a road segment is determined for this set by way of map matching and used for determining the path length. If the method is repeated for consecutive sets of position readings, particularly high accuracy results for a total length of the traveled path that is added over several sets or segments due to the direct use of the "good" position readings, while achieving increased robustness of the method as compared to "poor" position readings in individual road segments due to the map matching method that is employed.

In an advantageous embodiment, the set quality index is determined based on the position quality indices of the set as an average thereof. As a result, the position quality index of each position reading that is considered in the set is included in the set quality index. The decision as to whether the position readings should be used for determining the path length or whether the more robust map matching method should be employed is thus made based on the relevant position quality indices of the considered position readings.

As an alternative, the set quality index can be determined as a ratio of the number of position readings that are regarded (considered) in the set to the number of regarded and disregarded position readings. In this way, measuring inaccuracies of the position readings that are not considered are also indirectly taken into account and thus form a broader basis for a decision. In addition, such a simple comparison of the numbers can be used to determine the set quality index in a resource-efficient and quick manner.

If desired, the position readings can be generated by way of a mobile radio receiver of the onboard unit by localization in a public land mobile network. It is particularly advantageous for the position readings to be generated by way of a satellite navigation receiver of the onboard unit by localization in a global navigation satellite system (GNSS).

The position quality index can be determined in various variants, which may also be combined with each other or employed consecutively. According to a first embodiment, which is suited specifically for GNSS-based OBUs, the satellite navigation receiver issues a related DOP ("dilution of precision") value, such as an HDOP ("horizontal dilution of precision") value, for each position reading as a basis for the position quality index thereof DOP and HDOP values are natively provided for every position reading by many commercially available satellite navigation receivers and indicate the geometric relationships of the current satellite constellation, which here serve as a basis of a possible range of the respective position reading.

In an alternative or supplemental embodiment, the position quality index of a position reading is generated depending on the distance thereof from a nearest road segment of the digital road map. Such a procedure corresponds to a simplified map matching method, in which no complex plausibility checks are carried out based on neighboring position readings, but only the distance from the nearest road segment is determined. The robustness of the map matching method is thus already incorporated in the method as part of the generation of the position quality index, so that, for example, individual position readings located far off ("outliers") are not taken into consideration. This embodiment can be directly implemented in thick-client OBUs, where the digital road map is present in the OBU, and is therefore particularly advantageous. However, it is also possible to use thin-client OBUs for this purpose, which outsource this step to an external map matching system.

In a further alternative or additional embodiment, the position quality index of a position reading is generated depending on the distance thereof from an expected value, which is formed for this position reading by way of interpolation based on neighboring position readings in the sequence. Isolated "outliers" can thus be eliminated from the method without map matching. It is also possible to use more than two neighboring position readings for interpolation, in particular for interpolations of a higher (non-linear) order, which increases the accuracy.

Alternatively, the position quality index of a position reading can be generated depending on the distance thereof from an expected value, which is formed for this position reading by way of extrapolation based on preceding position readings in the sequence. Contrary to interpolation, subsequent position readings do not have to be known for this purpose, so that this variant is particularly suitable for real-time implementation. Again, more than one preceding position reading may be used for extrapolation purposes, in particular for extrapolations of a higher (non-linear) order or, for example, when employing a Kalman filter for extrapolation, which again increases the accuracy.

Today, many satellite navigation receivers can natively determine their respective speed and movement direction as well as their acceleration with high precision. In such cases, it is particularly advantageous if the satellite navigation receiver issues a related movement vector for each position reading, the vector being used to extrapolate the expected value. Such a movement vector that is formed of the speed and movement direction—optionally using the acceleration value—allows a particularly precise estimation of the expected value for the following position reading and provides a good starting point for generating the position quality index.

As an alternative, the onboard unit may receive a movement reading from a vehicle sensor for every position reading, the reading being used to extrapolate the expected value. The movement reading may be transmitted by a speed or inertia sensor, optionally also by a tachograph of the vehicle, and may also be a combination of the readings from such sensors. This likewise results in a precise estimation of the expected value, and more particularly without being dependent on a GNSS.

Consecutive sets of position readings could overlap each other. So as to favor a more rapid determination of the path length, consecutive sets of position readings may be extracted without overlap from the sequence of position readings because the path length can thus be determined quickly and completely with the lowest number of sets.

In an advantageous variant, the mutual distances are determined directly from the position readings. To this end, in an alternative variant, the onboard unit generates a related pair comprising speed and measuring time for each position reading, and the mutual distances of two consecutive position readings are determined based on the speed at the first of the two position readings and the difference of the measuring times of the two position readings. Because particularly precise values are generated for the speed and time, in particular in satellite navigation receivers, the latter variant allows the distances of consecutive position readings to be determined particularly precisely.

BRIEF DESCRIPTION OF THE DRAWINGS/FIGURES

Embodiments will be described in more detail hereafter with reference to the accompanying drawings. In the drawings.

Embodiments will now be described with reference to the accompanying drawings.

DETAILED DESCRIPTION

Figure 1:
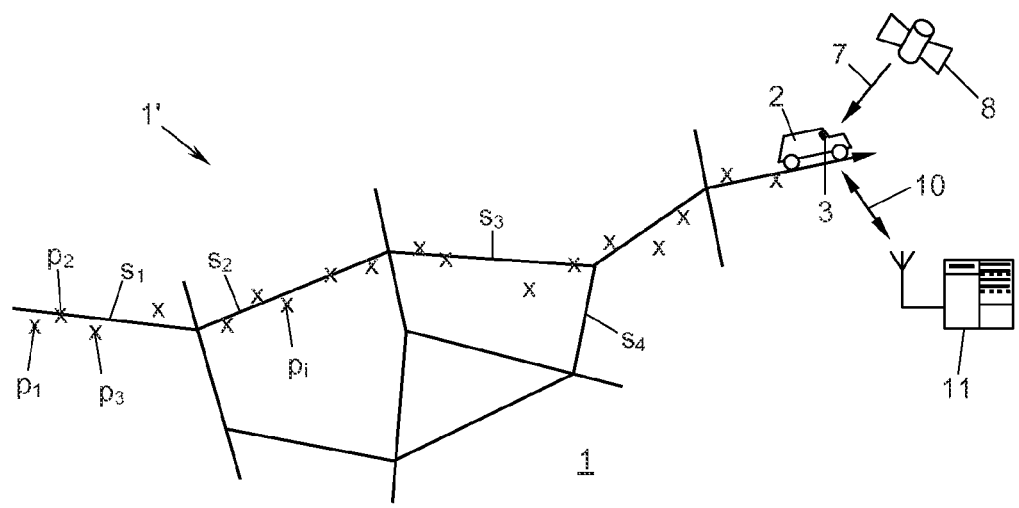
FIG. 1 shows a schematic top view onto a section of a road system modeled by a digital road map, according to an example embodiment

FIG. 1 shows a road system 1, which is modeled in the form of a digital road map 1' comprising a network graph of road segments $s_1, s_2, \ldots$, or in general terms $s_k$. An exemplary vehicle 2 carries an onboard unit (OBU) 3, which is capable of locating itself in the road system 1. In addition to a microprocessor 4 and a memory 5, the OBU 3 comprises a satellite navigation receiver 6 for this purpose (FIG. 2), by way of which the OBU receives navigation signals 7 of a global navigation satellite system 8 (GNSS) such as GPS (global positioning system), GLONASS (Global Navigation Satellite System), GALILEO or the like, and based thereon continually generates readings of its own position ("position fixes") $p_1, p_2, \ldots$, or in general terms $p_i$. Alternatively, the OBU 3 could also determine the position readings $p_i$ thereof in another manner, for example by way of radio triangulation, cell identifier evaluation or the like in a public land mobile network (PLMN) such as a GSM (Global System for Mobile Communications), UMTS (Universal Mobile Telecommunications System) or another 3G/4G/5G network.

Figure 2:
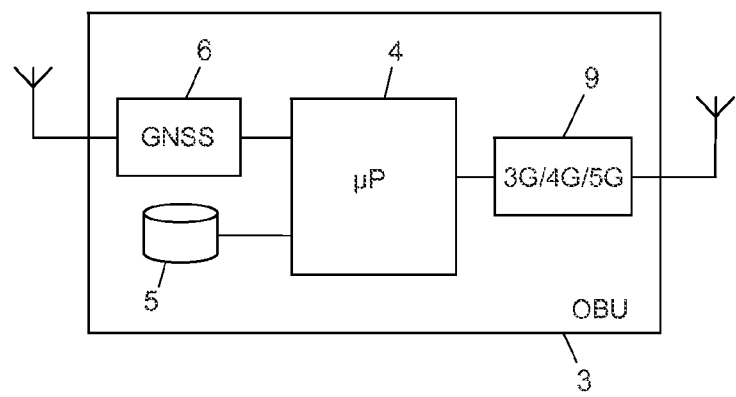
FIG. 2 is a schematic block diagram of an onboard unit suitable for use in the method, according to an exemplary embodiment.

According to FIG. 2, the OBU 3 is also equipped with a transceiver 9, by way of which the OBU can transmit the position readings $p_i$ in the described manner via a mobile communication network 10 to a toll back office 11. In the toll back office 11, the road segments $s_k$ on which the vehicle 2 has driven can be determined, for example based on the position data $p_i$ thus obtained by way of map matching with the digital road map 1'. The map matching could also be carried out in a separate map matching proxy server provided upstream of the toll back office 11, or directly in the OBU 3 if the digital road map is stored in the OBU memory 5. Based on the known segment lengths $l_k$ of the determined road segments $s_k$, which are stored in the digital road map 1', it is then possible to calculate the length l of the path traveled by the vehicle 2 in the road system 1.

Figure 3:
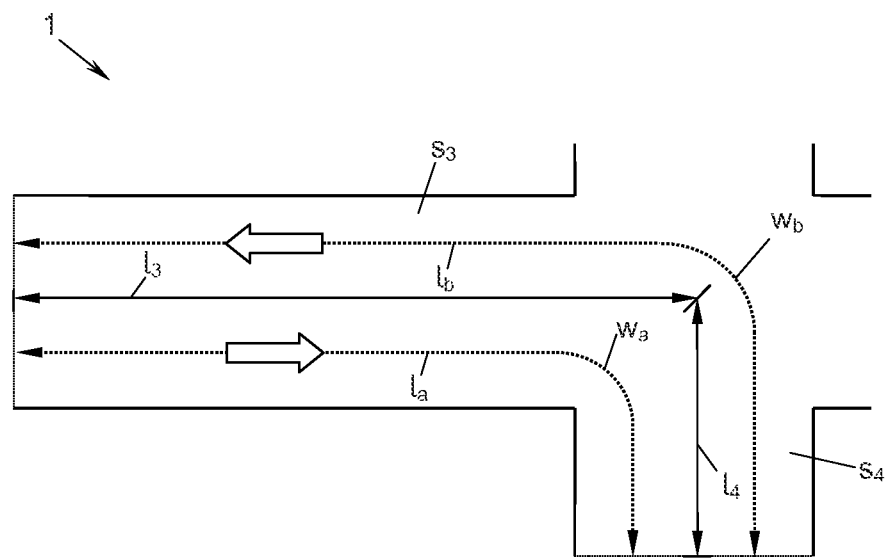
FIG. 3 is an enlarged detail view of one of the turns of the road system of FIG. 1, according to an example embodiment.

FIG. 3 illustrates one of the problems of such path length determination by map matching. Because of the limited resolution of digital road maps, which frequently model even multi-lane road sections only with a single road segment $s_k$, the path lengths $l_a$, $l_b$ of the paths $w_a$, $w_b$ traveled on different lanes deviate from the segment lengths $l_3$, $l_4$ stored therefor in the road map 1'. The method described hereafter overcomes this problem.

Figure 4:
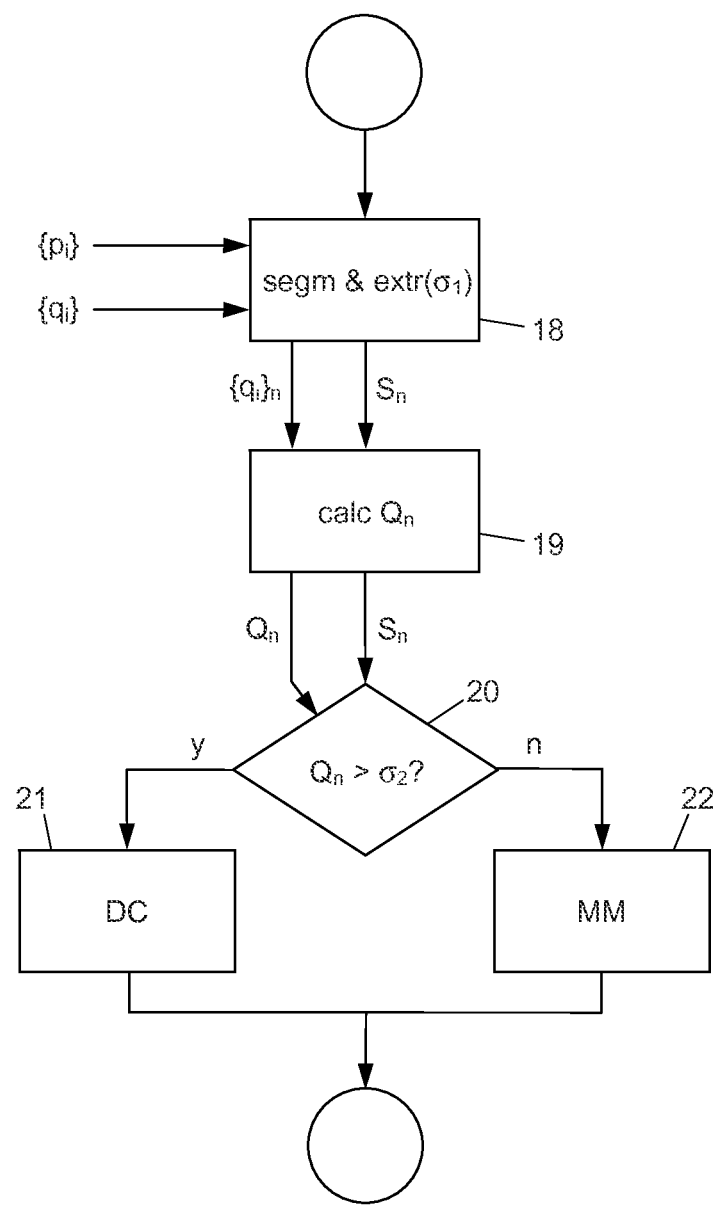
FIG. 4 shows a flowchart of the method for determining a path traveled by a vehicle in the road system of FIG. 1, according to an example embodiment.

FIG. 4 shows an overview of the method, and FIGS. 5 to 8 show the method in detail. The method of FIGS. 4 to 8 can take place both entirely in an OBU 3 or partially in an OBU 3 and partially in a toll back office 11 and/or a map matching proxy provided upstream thereof.

Figure 5:
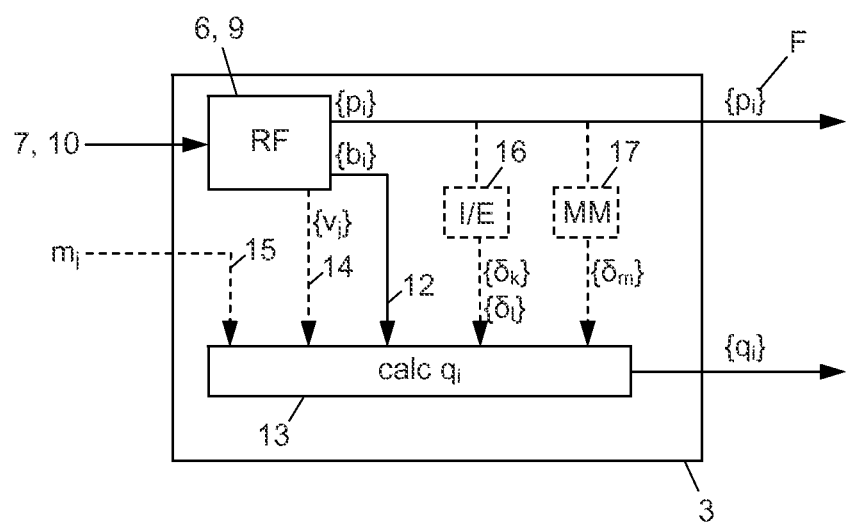
FIGS. 5 and 6 show different variants for generating a position quality index for a position reading, once in the form of a functional block diagram (FIG. 5) and once based on exemplary position readings in the road system (FIG. 6), according to example embodiments.
Figure 6:
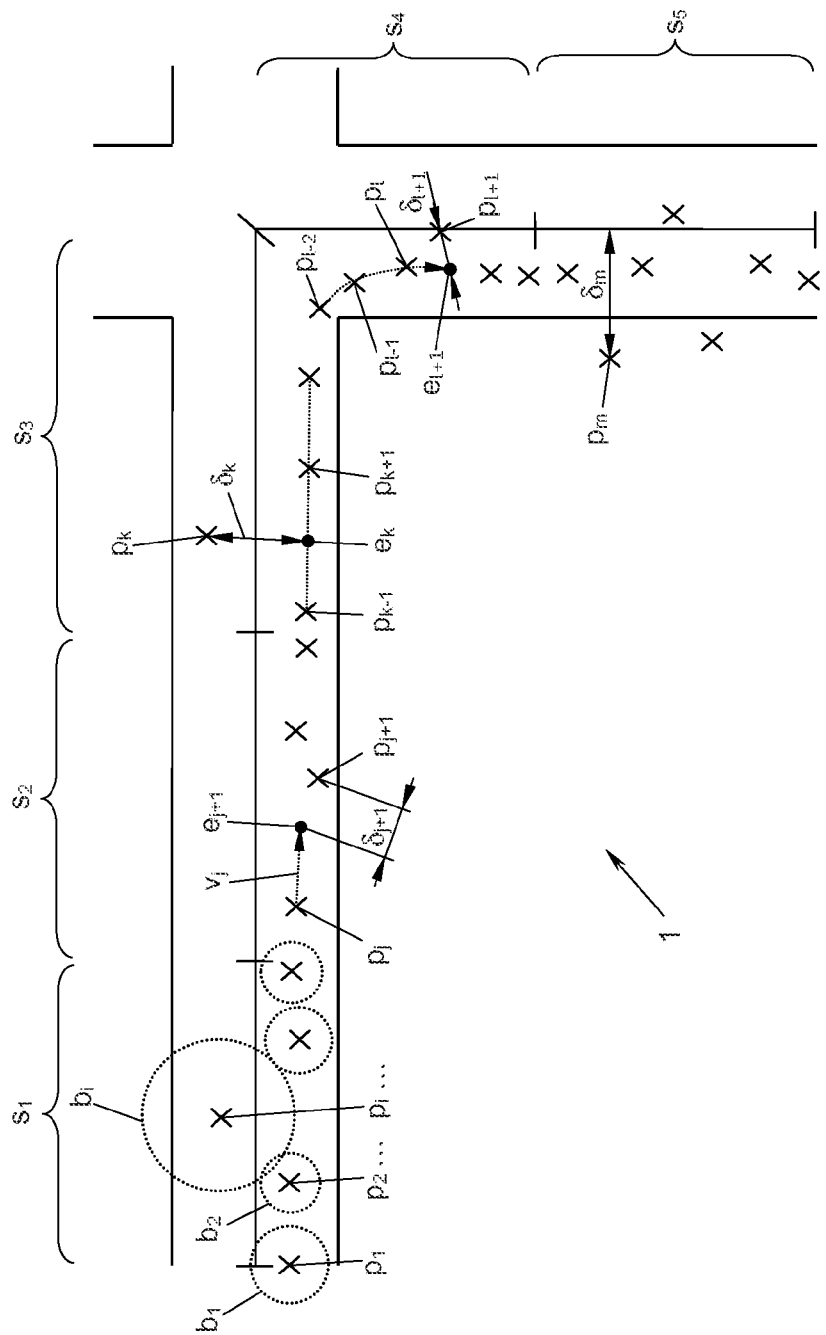

The method of FIG. 4 is based on a special configuration of the OBUs 3, according to which these generate a respective related quality index $q_i$ of the position reading $p_i$ for each position reading $p_i$, which is to say two mutually associated sequences $\{p_i\}$ (hereafter also referred to as F) and $\{q_i\}$ of position readings $p_i$ and position quality indices $q_i$ or a sequence $\{(p_i, q_i)\}$ of pairs of position readings $p_i$ and position quality indices $q_i$. FIGS. 5 and 6 show a variety of variants of generating a position quality index $q_i$ for a position reading $p_i$, wherein each of the exemplary road segments $s_1$ to $s_5$ of FIG. 6 shows a different variant.

As is shown in road segment $s_1$ of FIG. 6, a first option is that the OBU 3 uses a satellite navigation receiver 6, which on its own ("intrinsically") provides a measurement error value or range value $b_i$ for each position reading $p_i$, which in the simplest case can directly be used as a basis for the position quality index $q_i$, for example in the form of $q_i \hat{=} 1/b_i$. Such range values $b_i$ can, for example, be so-called DOP ("dilution of precision"), PDOP ("positional DOP"), TDOP ("time DOP"), GDOP ("geometric DOP") or HDOP ("horizontal DOP") values, as they are generated by commercially available GNSS receivers, for example GPS receivers, based on the current satellite constellation and the resulting measurement errors.

If the OBU 3 utilizes a mobile communication network transceiver 9 for position determination instead of (or in addition to) the satellite navigation receiver 6, the range value $b_i$ could, for example, also be intrinsically generated by the same, for example based on the currently receivable base stations of the mobile communication network 10 or the current localization accuracy of corresponding mobile communication network services ("location-based services").

Path 12 of FIG. 5 is a schematic illustration of such a direct use of the range values $b_i$ of the receivers 6, 9 for generating the position quality indices $q_i$ in a block 13.

A second variant of generating the position quality indices $q_i$ is illustrated in road segment $s_2$ of FIG. 6. In this variant, the satellite navigation receiver 6 also supplies a respective current movement vector $v_j$ for each position reading $p_j$ (see path 14 of FIG. 5), the vector comprising the direction and speed $g_j$ of the OBU 3, and perhaps also the acceleration thereof, wherein the values can also be determined with particularly high precision by commercially available satellite navigation receivers 6, for example by way of Doppler measurements using the received satellite navigation signal 7. Commercially available mobile communication receivers 9 could also determine such a movement vector $v_j$, for example based on Doppler measurements using the signals received from the surrounding base stations. In both variants, the movement vector $v_j$ could additionally or exclusively be determined by way of an inertial measurement unit (IMU) in conjunction with an electronic compass system, for example.

Proceeding from a current position reading $p_j$, it is possible, based on the current movement vector $v_j$, to estimate (extrapolate) an expected value $e_{j+1}$ for the respective next position reading $p_{j+1}$ of the sequence F or $\{p_i\}$, and the deviation $\delta_{j+1}$ of the next position reading $p_{j+1}$ from the expected value $e_{j+1}$ again constitutes a range index—assuming, for example, that a movement vector $v_j$ determined by way of Doppler measurement has very high accuracy—that can serve as a basis for calculating the position quality index $q_{j+1}$ of the position reading $p_{j+1}$ in block 13, for example in the form of $q_{j+1} \hat{=} 1/\delta_{j+1}$.

As an alternative (or in addition) to the movement vector $v_j$, the OBU 3 could also receive movement values $m_j$ from a vehicle sensor of the vehicle 2, for example a speed or inertia sensor, tachometer, odometer, tachograph or the like, see path 15 of FIG. 5, wherein these values can also be used to determine an expected value $e_{j+1}$ for the next position reading $p_{j+1}$ and thus the deviation $\delta_{j+1}$ and the position quality index $q_{j+1}$.

Another variant for creating the position quality index $q_i$ is shown based on road segments $s_3$ and $s_4$ of FIG. 6 and block 16 of FIG. 5, in particular by way of interpolation or extrapolation of expected values $e_k$, $e_{l+1}$ based on the sequence F of position readings $p_i$. In road segment $s_3$, an expected value $e_k$ is formed by way of example by interpolation between two position readings $p_{k-1}$ and $p_{k+1}$ adjoining the position reading $p_k$, and the deviation $\delta_k$ of the position reading $p_k$ is determined. In road segment $s_4$, an expected value $e_{l+1}$ is formed for a next position reading $p_{l+1}$ by way of extrapolation based on preceding position readings . . . , $p_{l-2}$, $p_{l-1}$, $p_l$, and the deviation $\delta_{l+1}$ of the position reading $p_{l+1}$ is again determined.

The interpolation or extrapolation can also be carried out in each case based on two or more preceding or subsequent position readings $p_i$ of the sequence F, and both linear interpolations and extrapolations as well as those of higher orders ("wavelet fitting", "spline fitting") may be considered and carried out in a corresponding interpolating or extrapolating unit 16 of FIG. 5.

Based on the deviations $\delta_k$, $\delta_l$, it is then again possible in block 13 to determine the corresponding position quality indices $q_i$ (here: $q_k$, $q_l$), for example in the form of $q_k \hat{=} 1/\delta_k$ and $q_l \hat{=} 1/\delta_l$.

Road segment $s_5$ of FIG. 6 and block 17 of FIG. 5 show a variant in which the distance or the deviation $\delta_m$ from the nearest road segment $s_k$, here $s_5$, is determined for every position reading $p_m$ by map matching comparison with the digital road map 1'. When using a thick-client OBU, the map matching of block 17 can be carried out in the OBU 3; in the case of a thin-client OBU, this step may be outsourced to an external map matching proxy or the toll back office 11. The deviation $\delta_m$ can then again be used to determine the position quality index $q_m \hat{=} 1/\delta_m$ for the position reading $p_m$ in block 13.

Of course, the position quality index $q_i$ in block 13 can also be calculated using any arbitrary function F, for example the weighted sum, of the range values $b_i$ and deviations $\delta_j$, $\delta_k$, $\delta_l$, $\delta_m$, which is to say $q_i = f(b_i, \delta_j, \delta_k, \delta_l, \delta_m)$.

The values obtained via paths 12 and 15 to 17 could optionally also be evaluated in multiple stages in block 13 so as to generate the quality index $q_i$, for example initially with the aid of the range values $b_i$ and, if these are sufficiently small, subsequently based on the expected values $e_i$, $e_j$, $e_k$, $e_l$. It would also be possible to generate the position quality indices $q_i$ differently for different position readings $p_i$, for example if, during the GNSS localization, DOP values existed that are not created with intermediate mobile communication localization, or if the position quality indices $q_i$ are formed based on manufacturer-specific quality indicators that can be generated by commercially available GNSS receivers.

Figure 7:
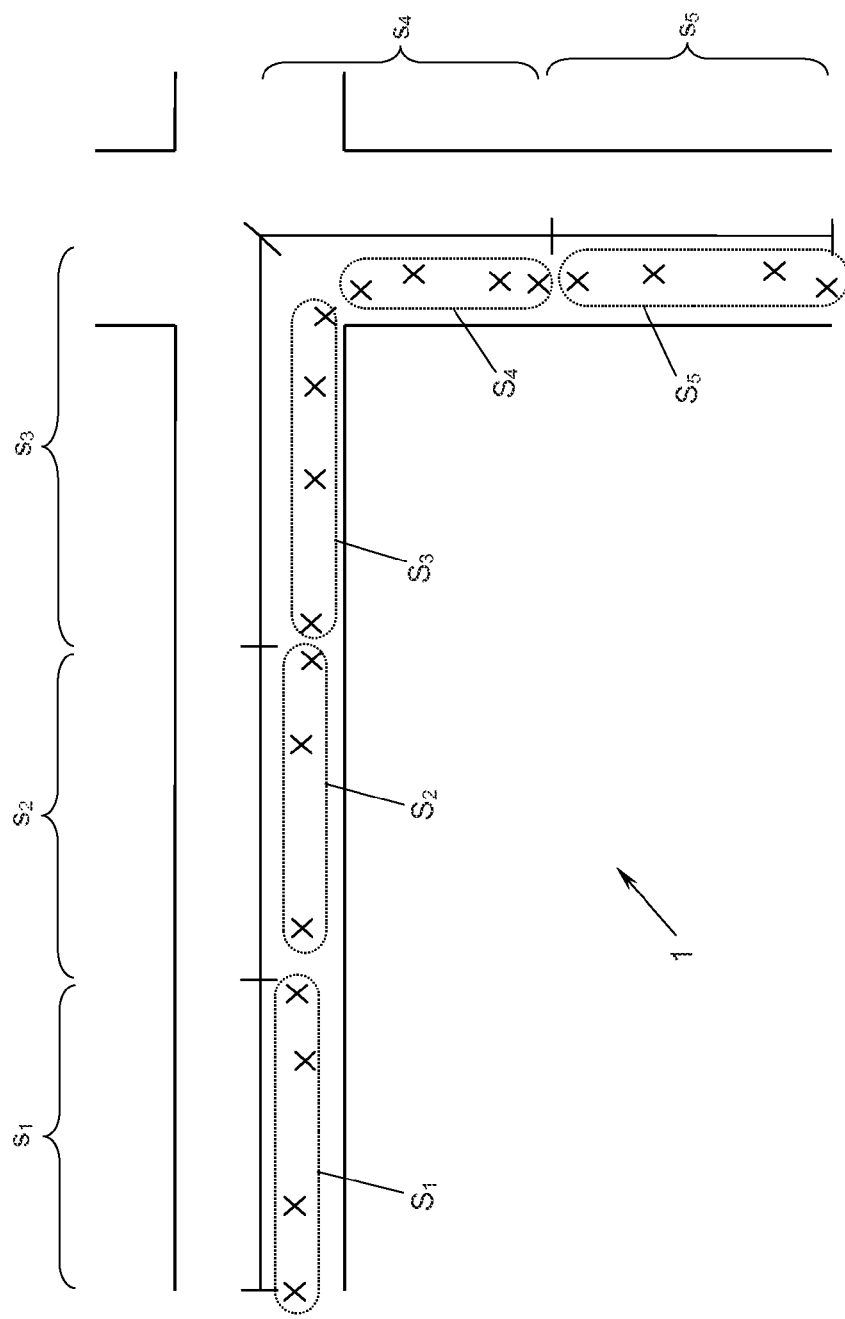
FIG. 7 shows in detail a step of extracting sets of position readings in keeping with the variants of FIGS. 5 and 6, according to an example embodiment.

To come back to FIG. 4, in a first step 18 of the method, consecutive segments or sets $S_1$, $S_2$, ..., or in general terms $S_n$, of position readings are extracted from the sequences $\{p_i\}$ and $\{q_i\}$ of position readings and related position quality indices generated by the OBU 3, in particular so that position reading $p_i$, the position quality indices $q_i$ of which do not reach or fall below a predetermined first threshold value $\sigma_1$, are not included in the sets $S_n$, which is to say are not considered. FIG. 7 shows the result of step 18 for the exemplary position readings of FIG. 6.

As is shown in FIG. 7, the position reading $p_i$ from road segment $s_1$ of FIG. 6 that was not taken into consideration in set $S_1$ was the reading, the large range $b_i$ of which had resulted in a position quality index $q_i$ smaller than the threshold value $\sigma_1$. Likewise, the exemplary position readings $p_{j+1}$, $p_k$, $p_{l+1}$ of FIG. 6 were not considered in sets $S_2$, $S_3$ and $S_4$ because the deviations $\delta_{j+1}$, $\delta_k$, $\delta_{l+1}$ thereof from the respective expected values $e_{j+1}$, $e_k$, $e_{l+1}$ was large and the position quality indices $q_{j+1}$, $q_k$, $q_{l+1}$ thereof were thus smaller than the threshold value $\sigma_1$. The exemplary position reading $p_m$—in addition to others—from road segment $s_5$ of FIG. 6 was not included in set $S_5$, since the large distance $\delta_m$ of this value from road segment $s_5$ had resulted in a position quality index $q_m$ that did not reach the threshold value $\delta_1$.

Sets $S_n$—and the respective related sets $\{q_i\}_n$ of position quality indices $q_i$—from the sequences $\{p_i\}$ and $\{q_i\}$ can be extracted in particular in such a way that neighboring sets $S_n$ follow each other without overlap, although this is not essential. It is also not required for the sets $S_n$ to approximately follow the road segments $s_k$, as is shown in FIGS. 6 and 7 only for improved clarity. In fact, the extraction ("segmentation and extraction") of the sets $S_n$ in step 18 can take place entirely detached from the segmentation of the road system 1 in the digital road map 1', although use of the road segments $s_k$ as an approximate basis is favorable not only for the map matching shown in road segment $s_5$ in order to determine the distance $\delta_m$ but also for the remaining steps of the method for determining the path traveled by the vehicle 2.

The sets $S_n$ of position readings $p_i$ exceeding the threshold value $\sigma_i$ that were extracted in step 18 are then supplied—together with the position quality indices $\{q_i\}_n$ associated with sets $S_n$—to a method step 19, in which a set quality index $Q_n$ is determined for every set $S_n$, in particular in the following manner.

In one embodiment, the set quality index $Q_n$ is determined based on the respective position quality indices $q_i$ of the position readings $p_i$ included in set $S_n$, for example as an average or a weighted sum thereof, for which purpose all methods known in mathematics or statistics for linking reading are suited.

In a simplified embodiment, the set quality index $Q_n$ is formed only of the number A of position readings $p_i$ that are included in set $S_n$, for example the absolute number of position readings $p_i$ in set $S_n$, or a "relative" number in relation to the original position readings $p_i$ of the sequence F, which is to say as a ratio of the number of position readings $p_i$ considered in set $S_n$ to the sum of position readings $p_i$ considered and not considered in set Sn. To this end, it is also possible to specify a minimum number of position readings $p_i$ in set $S_n$, below which the set quality index $Q_n$ must be set to zero.

The sets $S_n$ and the set quality indices $Q_n$ thereof are then supplied to a comparison step 20, in which the set quality index $Q_n$ of every set $S_n$ is compared to a predetermined second threshold value $\sigma_2$. If the set quality index $Q_n$ exceeds the second threshold value $\sigma_2$, which means that the quantity or overall quality of the position readings $p_i$ of set $S_n$ is sufficiently good, the process branches off to a calculating step 21 (branch "y"), in which the path traveled by the vehicle 2 is determined directly based on the mutual distances $a_i$ of the consecutive position readings $p_i$ of set $S_n$ ("direct calculation", DC).

Figure 8:
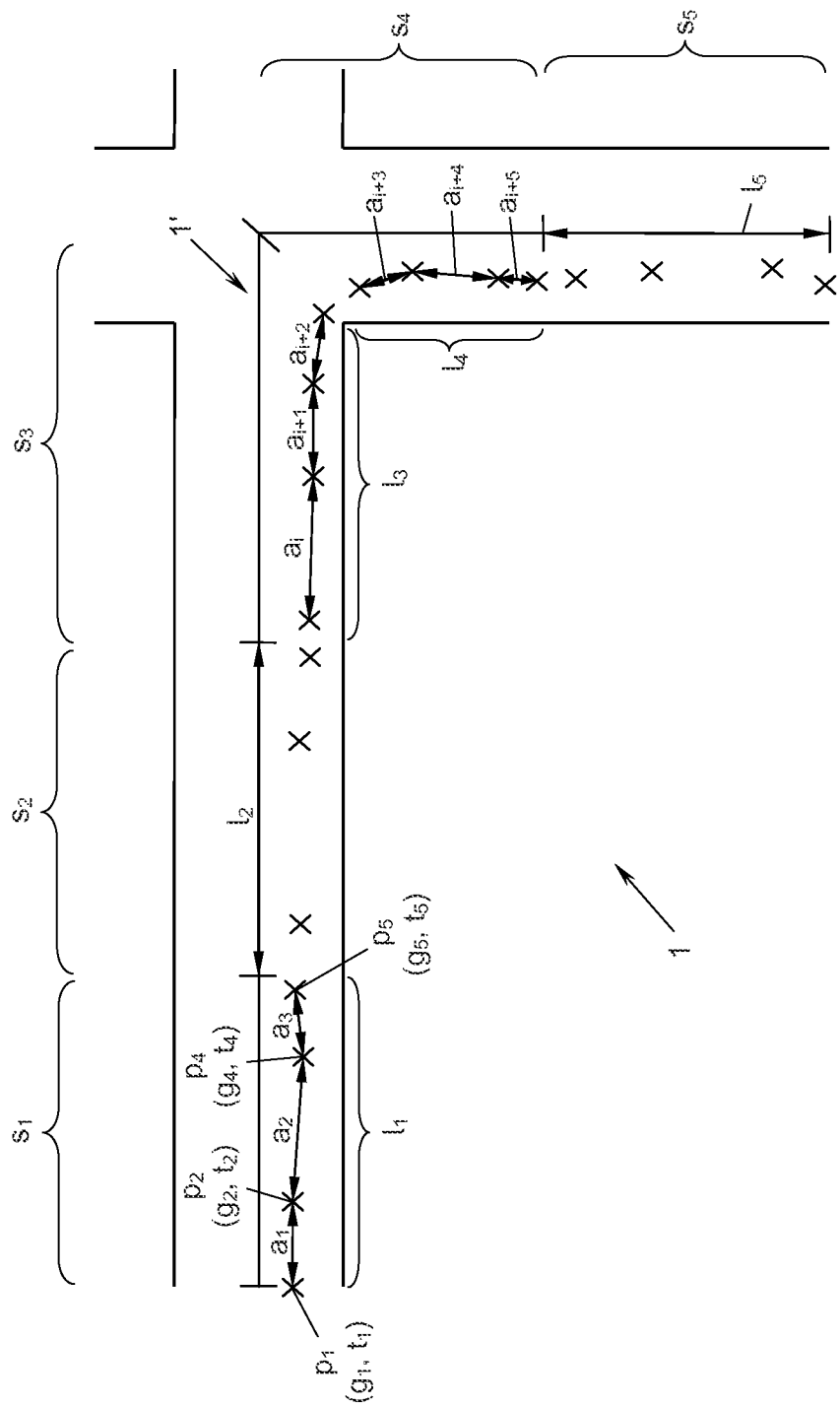
FIG. 8 shows in detail a set quality-dependent path length determination based on the example of FIGS. 5 to 7, according to embodiments.

This is shown in FIG. 8 by way of example for road segments $s_1$, $s_3$ and $s_4$ and for sets $S_1$, $S_3$ and $S_4$, the set quality indices $Q_1$, $Q_3$ and $Q_4$ of which exceeded the threshold value $\sigma_2$. The length $l_1$ of the path traveled in road segment $s_1$ and set $S_1$ here follows from the sum of the mutual distances $a_1$, $a_2$ and $a_3$ of the consecutive position readings $p_1$, $p_2$, $p_4$ and $p_5$ of set $S_1$, which is to say by not taking into consideration the position reading $p_3$ ($p_i$ in FIG. 6) that was already excluded in step 18.

The distances $a_1$, $a_2$ and $a_3$ can be determined directly based on the geometric distances of the position readings $p_1$, $p_2$, $p_4$ and $p_5$, which is to say $a_i\hat{=}(p_{i+1}-p_i)$. If the onboard unit 3 has also generated a related pair $(g_i, t_i)$ comprising speed $g_i$ and measuring time $t_i$ for every position reading $p_i$, for example with the aid of the satellite navigation receiver 6, the distances $a_1$, $a_2$ and $a_3$ can alternatively also be determined based on the speeds $g_1$, $g_2$ and $g_4$ and the respective differences of the measuring times $t_1$, $t_2$, $t_4$ and $t_5$ of the position readings $p_1$, $p_2$, $p_4$ and $p_5$, which is to say in the form of $a_i\hat{=}g_i\cdot(t_{i+1}-t_i)$.

In the present example, the set quality index $Q_1$ of set $S_1$ was formed as an average of the position quality indices $q_i$ of the position readings $p_i$ included in set $S_1$. The lengths $l_3$ and $l_4$ for sets $S_3$ and $S_4$ were determined in the same manner.

However if, in comparison step 20, the set quality index $Q_n$ does not reach the second threshold value $\sigma_2$, the method branches off to the alternative calculation step 22 (branch "n"), in which the path traveled by the vehicle 2 is determined by way of map matching ("MM"). This, in turn, is shown in FIG. 8 by way of example for road segments $s_2$ and $s_5$ and for sets $S_2$ and $S_5$, the set quality indices $Q_2$ and $Q_5$ of which did not reach the threshold value $\sigma_2$. In the case of set $S_2$, for example, the number A of position readings $p_i$ included in set $S_2$ fell below a minimum number (here: four), and in the case of set $S_5$, the relative number A=4/7 (four out of a total of seven position readings $p_i$ were considered) was below the second threshold value $\sigma_2$.

In calculation step 22, the length $l_2$ or $l_4$ of the path traveled by the vehicle 2 in road segment $s_2$ or $s_5$ and set $S_2$ or $S_5$ is determined by way of map matching based on the segment lengths $l_2$ and $l_5$ of the road segments $s_2$ and $s_5$ stored in the digital road map 1'. To this end—as was already described based on FIG. 3—the position readings $p_i$ of set $S_n$ are associated with the respective nearest road segment(s) and the segment length(s) $l_k$ thereof are searched in the road map F. The map matching step 22 can again be carried out either in the OBU 3 (in the case of thick-client OBUs) or externally (in the case of thin-client OBUs), depending on the configuration of the OBU 3.

If the method of FIG. 4 is repeated for consecutive sets $S_n$, the respective determined path lengths $l_1, l_2, l_3, \ldots l_n$ can be added to form a total path length $$l = \sum_n l_n$$

traveled by the vehicle 2. The traveled path length l thus added is more accurate than a path length calculated exclusively by way of direct calculation (DC) 21 or map matching (MM) 22.

It goes without saying that, in practical experience, the position readings $p_i$ can be generated considerably more frequently, and thus as a closer sequence F, than has been shown in a drastically simplified manner in FIGS. 1 and 6 to 8 for clarity reasons. The road segments $s_k$ can also differ from toll segments of existing road toll systems, and in particular they can have shorter segment lengths $l_k$. The sets $S_n$ are advantageously harmonized with the road segments $s_k$ so that two sets $S_n$, $S_{n+1}$ also adjoin each other in the region of boundaries between two road segments $s_k$, $s_{k+1}$; if the sequence F of position readings $p_i$ is closer, potential deviations at the boundaries between road segments $s_k$, $s_{k+1}$ become negligible or average out over longer path lengths.

Conclusion

The invention is not limited to the shown embodiments, but encompasses all variants, combinations and modifications that are covered by the scope of the accompanying claims. While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the described embodiments should not be limited by any of the above-described exemplary embodiments, but should be defined only in accordance with the following claims and their equivalents.

What is claimed is:

1. A method for determining the length of a path traveled by a vehicle using an onboard unit carried by the vehicle, the unit generating a sequence of readings of an own position thereof and a related position quality index for each position reading of the sequence, comprising:

extracting a set of consecutive position readings from the sequence, disregarding those position readings, the position quality indices of which fall below a predetermined first threshold value;

determining a set quality index based on the number of position readings of the set or based on the position quality indices thereof; and if the set quality index exceeds a predetermined second threshold value: determining the path length based on mutual distances of consecutive position readings of the set;

otherwise: determining the path length using a digital road map, which is composed of road segments having respective known segment lengths, by associating the position readings of the set with at least one road segment, and determining the path length based on the segment length of the at least one road segment.

2. The method according to claim 1, wherein the set quality index is determined based on the position quality indices of the set as an average thereof.

3. The method according to claim 1, wherein the set quality index is determined as a ratio of the number of position readings that are regarded in the set to the number of regarded and disregarded position readings.

4. The method according to claim 1, wherein the position readings are generated by way of a mobile communication receiver of the onboard unit by localization in a public land mobile network.

5. The method according to claim 1, wherein the position readings are generated by way of a satellite navigation receiver of the onboard unit by localization in a satellite navigation system.

6. The method according to claim 5, wherein the satellite navigation receiver issues a related DOP (dilution of precision) value for each position reading as a basis for the position quality index thereof.

7. The method according to claim 1, wherein the position quality index of a position reading is generated depending on the distance thereof from the nearest road segment of the digital road map.

8. The method according to claim 1, wherein the position quality index of a position reading is generated depending on the distance thereof from an expected value, which is formed for the position reading by way of interpolation based on neighboring position readings of the sequence.

9. The method according to claim 1, wherein the position quality index of a position reading is generated depending on the distance thereof from an expected value, which is formed for the position reading by way of extrapolation based on preceding position readings of the sequence.

10. The method according to claim 9, wherein the position readings are generated by way of a satellite navigation receiver of the onboard unit by localization in a satellite navigation system, and wherein the satellite navigation receiver issues a related movement vector for each position reading, the vector being used to extrapolate the expected value.

11. The method according to claim 9, wherein the onboard unit receives a movement reading from a vehicle sensor for every position reading, the movement reading being used to extrapolate the expected value.

12. The method according to claim 1, wherein consecutive sets of position readings are extracted without overlap from the sequence of position readings.

13. The method according to claim 1, wherein the mutual distances are determined directly based on the position readings.

14. The method according to claim 1, wherein the onboard unit generates a related pair comprising a speed and measuring time for every position reading, and the mutual distances of two respective consecutive position readings are determined based on the speed at the first of the two position readings and the difference of the measuring times of the two position readings.

15. An onboard unit carried in a vehicle, comprising:

a receiver configured to generate a sequence of readings of an own position thereof;

a microprocessor configured to generate a related position quality index for each position reading of the sequence, to extract a set of consecutive position readings from the sequence, and to disregard those position readings from the extracted set having position quality indices that fall below a predetermined first threshold value; and wherein the microprocessor is configured to determine a set quality index based on the number of position readings of the set or based on the position quality indices thereof.

16. The onboard unit of claim 15, wherein the onboard unit further comprises:

a memory that stores a digital road map that is composed of road segments having respective known segment lengths;

wherein, if the set quality index exceeds a predetermined second threshold value, the microprocessor is configured to determine a path length based on mutual distances of consecutive position readings of the set; and wherein, if the set quality index does not exceed the predetermined second threshold value, the microprocessor is configured to determine the path length using the digital road map by associating the position readings of the set with at least one road segment, and determining the path length based on the segment length of the at least one road segment.

17. The onboard unit of claim 15, further comprising:
a transceiver configured to transmit the extracted set and the set quality index from the onboard unit to be used to determine the length of a path traveled by the vehicle.

18. The onboard unit of claim 15, further comprising:
a mobile communication receiver that generates the position readings by way of localization in a public land mobile network.

19. The onboard unit of claim 15, further comprising:
a satellite navigation receiver that generates the position readings by way of localization in a satellite navigation system.

20. The onboard unit of claim 15, wherein the set quality index is determined based on the position quality indices of the set as an average thereof, or as a ratio of the number of position readings that are regarded in the set to the number of regarded and disregarded position readings; and wherein the position quality index of a position reading is generated depending on the distance thereof from the nearest road segment of a digital road map, depending on the distance thereof from an expected value, which is formed for the position reading by way of interpolation based on neighboring position readings of the sequence, or depending on the distance thereof from an expected value, which is formed for the position reading by way of extrapolation based on preceding position readings of the sequence.

\* \* \* \* \*